(12) United States Patent
Jung et al.

(10) Patent No.: US 12,315,517 B2
(45) Date of Patent: May 27, 2025

(54) METHOD AND SYSTEM FOR CORRECTING SPEAKER DIARIZATION USING SPEAKER CHANGE DETECTION BASED ON TEXT

(71) Applicants: NAVER CORPORATION, Seongnam-si (KR); LINE WORKS CORP., Tokyo (JP)

(72) Inventors: Namkyu Jung, Seongnam-si (KR); Geonmin Kim, Seongnam-si (KR); Youngki Kwon, Seongnam-si (KR); Hee Soo Heo, Seongnam-si (KR); Bong-Jin Lee, Seongnam-si (KR); Chan Kyu Lee, Seongnam-si (KR)

(73) Assignees: NAVER CORPORATION, Seongnam-si (KR); LINE WORKS CORP., Tokyo (JP)

( * ) Notice: Subject to any disclaimer, the term of this patent is extended or adjusted under 35 U.S.C. 154(b) by 256 days.

(21) Appl. No.: 17/665,672

(22) Filed: Feb. 7, 2022

(65) Prior Publication Data
US 2022/0254351 A1 Aug. 11, 2022

(30) Foreign Application Priority Data

Feb. 8, 2021 (KR) .......................... 10-2021-0017814

(51) Int. Cl.
*G10L 17/14* (2013.01)
*G06F 40/284* (2020.01)
(Continued)

(52) U.S. Cl.
CPC .............. *G10L 17/14* (2013.01); *G10L 17/22* (2013.01); *G10L 21/028* (2013.01)

(58) Field of Classification Search
CPC ....... G10L 17/14; G10L 17/22; G10L 21/028; G10L 15/26; G10L 17/06; G10L 17/02;
(Continued)

(56) References Cited

U.S. PATENT DOCUMENTS

2016/0225374 A1 8/2016 Rodriguez

FOREIGN PATENT DOCUMENTS

JP 5296455 B2 9/2013
JP 2020140169 A 9/2020
(Continued)

OTHER PUBLICATIONS

Meng et al. "Hierarchical RNN with Static Sentence-Level Attention for Text-based Speaker Change Detection" ArXiv:1703.07713v2 [cs.CL]Sep. 28, 2018 (Year: 2018).*
(Continued)

*Primary Examiner* — Daniel C Washburn
*Assistant Examiner* — Penny L Caudle
(74) *Attorney, Agent, or Firm* — GREER BUIRNS & CRAIN, LTD.

(57) ABSTRACT

A method and system for correcting speaker diarization using a text-based speaker change detection. A speaker diarization correction method may include performing speaker diarization on an input audio stream; recognizing speech included in the input audio stream and converting the speech to text; detecting a speaker change based on the converted text; and correcting the speaker diarization based on the detected speaker change.

8 Claims, 4 Drawing Sheets

(51) Int. Cl.
  *G10L 15/26*        (2006.01)
  *G10L 17/22*        (2013.01)
  *G10L 21/028*       (2013.01)

(58) Field of Classification Search
  CPC ............. G10L 2015/221; G06F 40/216; G06F 40/284; G06F 40/35
  See application file for complete search history.

(56) References Cited

FOREIGN PATENT DOCUMENTS

| KR | 1020140014318 | 8/2015 |
|---|---|---|
| KR | 102208387 B1 | 1/2021 |
| KR | 1020210009617 A | 1/2021 |

OTHER PUBLICATIONS

Reimers, Nils, and Iryna Gurevych. âSentence-BERT: Sentence Embeddings Using Siamese BERT-Networks.â ArXiv (Cornell University). Ithaca: Cornell University Library, arXiv.org, 2019. Web. (Year: 2019).*

* cited by examiner

METHOD AND SYSTEM FOR CORRECTING SPEAKER DIARIZATION USING SPEAKER CHANGE DETECTION BASED ON TEXT

CROSS-REFERENCE TO RELATED APPLICATION(S)

This U.S. non-provisional application claims the benefit of priority under 35 U.S.C. § 119 to Korean Patent Application No. 10-2021-0017814 filed on Feb. 8, 2021, in the Korean Intellectual Property Office (KIPO), the entire contents of which are incorporated herein by reference.

BACKGROUND OF THE INVENTION

Field of Invention

One or more example embodiments of the following description relate to a method and system for correcting a speaker diarization using a text-based speaker change detection.

Description of Related Art

Speaker diarisation or speaker diarization (hereinafter, speaker diarization) refers to a process of segmenting an input audio stream into homogenous segments according to a speaker identifier. Speaker diarization may improve the readability of automatic speech conversion by structuring an audio stream into a series of segments, by speaker, and by providing an actual identifier for each speaker, when being used with a speaker recognition system. One of the most popular methods for the speaker diarization is to model each speaker using a Gaussian mixture model and may allocate a frame corresponding to each speaker using a hidden Markov model.

However, in the related art, for example, Korean Patent Laid-Open Publication No. 10-2015-0093482, various types of errors occur since speaker diarization is performed using only speech. For example, a frequent error relates to the system determining that there has been a change in speaker (i.e., a speaker change) in a portion of the audio stream where, in actuality, there has not been a change in speaker (i.e., the speaker change should be absent).

BRIEF SUMMARY OF THE INVENTION

One or more example embodiments provide a method and system for correcting speaker diarization that may correct a point of a speaker change error by detecting a speaker change based on recognized text after performing a speech-based speaker diarization.

According to an aspect of at least one example embodiment, there is provided a speaker diarization correction method of a computer apparatus including at least one processor, the method including, by the at least one processor, performing speaker diarization on an input audio stream; recognizing speech included in the input audio stream and converting the speech to text; detecting a speaker change based on the converted text; and correcting the speaker diarization based on the detected speaker change.

The detecting of the speaker change may include recognizing a speaker change status for each word unit of text using a module that is trained to receive a speech recognition result for each utterance section and to output a speaker change probability of a word unit.

The detecting of the speaker change may include receiving a speech recognition result for each utterance section; encoding text included in the speech recognition result for each utterance section to a word unit of text; encoding the word unit of text to consider a conversation context; and determining whether there has been a change in speaker (a speaker change) compared to a previous word unit of text, for each word unit of text, where the determining includes considering the conversation context.

The speech recognition result for each utterance section may include a speech recognition result in an "EndPoint Detection" (EPD) unit.

The encoding of the text to the word unit of text may include encoding an EPD unit of text included in the speech recognition result for each utterance section to the word unit of text using "sentence Bidirectional Encoder Representations from Transformers" (sBERT).

The encoding of the word unit of text that considers the conversation context may include encoding the word unit of text to consider the conversation context using "dialog Bidirectional Encoder Representations from Transformers" (dBERT).

The correcting may include correcting the speaker diarization based on the word unit depending on whether a speaker change is present for each word unit of text.

According to an aspect of at least one example embodiment, there is provided a non-transitory computer-readable record medium storing instructions that, when executed by a processor, cause the processor to perform the method.

According to an aspect of at least one example embodiment, there is provided a computer apparatus including at least one processor configured to execute computer-readable instructions. The at least one processor causes the computer apparatus to perform speaker diarization on an input audio stream, to recognize speech included in the input audio stream and to convert the speech to text, to detect a speaker change based on the converted text, and to correct the speaker diarization based on the detected speaker change.

According to some example embodiments, it is possible to correct the point of a speaker change error by detecting a speaker change based on a recognized text after performing a speech-based speaker diarization.

Further areas of applicability will become apparent from the description provided herein. The description and specific examples in this summary are intended for purposes of illustration only, and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A speaker diarization correction system according to the example embodiments may be implemented by at least one computer apparatus and a speaker diarization correction method according to the example embodiments may be performed by the at least one computer apparatus included in the speaker diarization correction system. A computer program according to an example embodiment may be installed and executed on the computer apparatus, and the computer apparatus may perform the speaker diarization correction method according to the example embodiments under control of the executed computer program. The aforementioned computer program may be stored in a computer-readable storage medium in order to computer-implement the speaker diarization correction method in conjunction with the computer apparatus.

Figure 1:
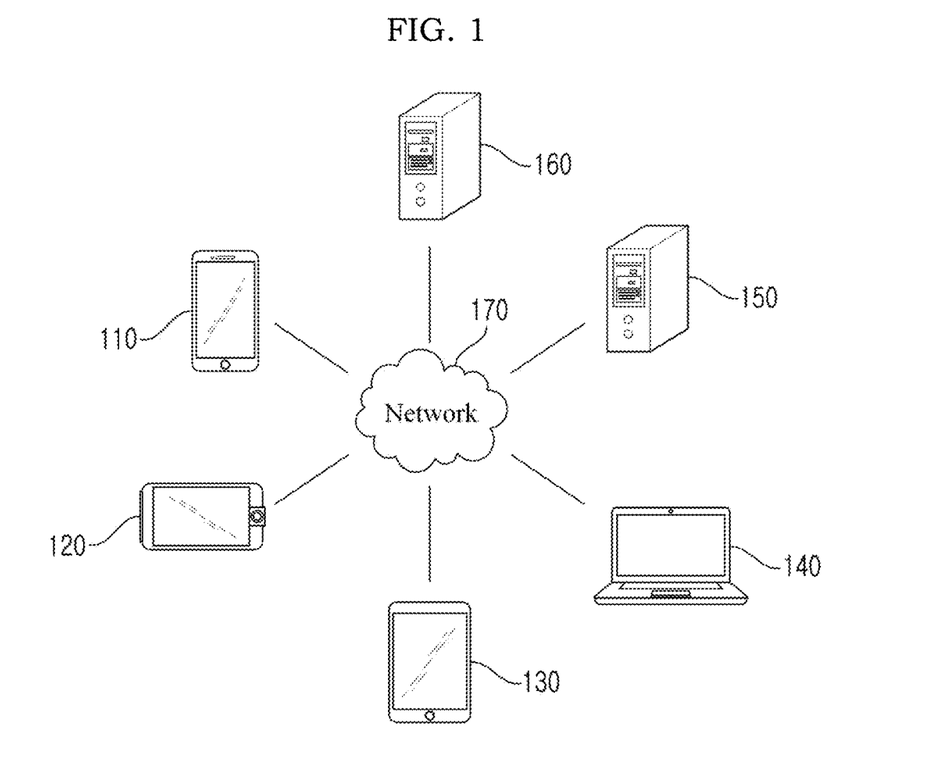
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices and/or the number of servers is not limited to those shown in the figure. Also, the network environment of FIG. 1 is provided as an example among environments applicable to the example embodiments, and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may each be configured as a smartphone, a mobile phone, a navigation device, a computer, a laptop computer, a digital broadcasting terminal, a personal digital assistant (PDA), a portable multimedia player (PMP), a tablet personal computer (PC), or the like. For example, although FIG. 1 illustrates the shape of a smartphone as an example of the electronic device 110, the electronic device 110 used herein may refer to one of any of the various types of physical computer apparatuses capable of communicating with other electronic devices 120, 130, and 140, and/or the servers 150 and 160 over the network 170 in a wireless or wired communication manner.

The communication scheme is not limited, and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of any number of network topologies that include a personal area network (PAN), a local area network (LAN), a campus area network (CAN), a metropolitan area network (MAN), a wide area network (WAN), a broadband network (BBN), and the Internet. Also, the network 170 may include at least one of any number of network topologies that include a bus network, a star network, a ring network, a mesh network, a star-bus network, a tree or hierarchical network, and the like. However, these descriptions are provided as examples only.

Each of the servers 150 and 160 may be configured as a computer apparatus, or as a plurality of computer apparatuses, that provide(s) an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. The service may be, for example, a content providing service, a group call service (or an audio conference service), a messaging service, a mail service, a social network service, a map service, a translation service, a financial service, a payment service, and a search service.

Figure 2:
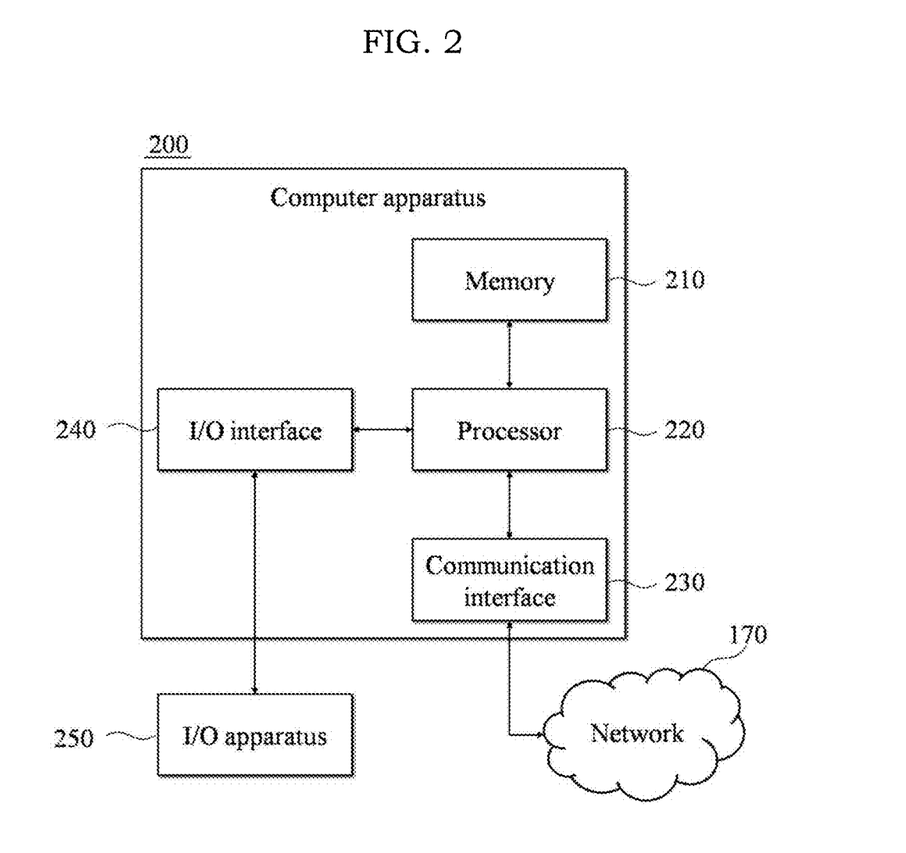
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 of FIG. 1 and each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as a ROM and a disk drive, may be included in the computer apparatus 200 as a permanent storage device separate from the memory 210. Also, an operating system (OS) and at least one program code may be stored in the memory 210. Such software components may be loaded to the memory 210 from another non-transitory computer-readable record medium that is separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of through the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus, such as, for example, the aforementioned storage devices. For example, the processor 220 of the computer apparatus 200 may forward a request or an instruction created based on a program code stored in the storage device (such as the memory 210), data, and/or a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, content, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components that is greater than or less than the number of components shown in FIG. 2. However, there is no need to clearly illustrate many components according to the related art because such components are known to those of ordinary skill in the art. For example, the computer apparatus 200 may include at least a portion of the I/O apparatus 250, or may further include other components, for example, a transceiver, a database, etc.

Figure 3:
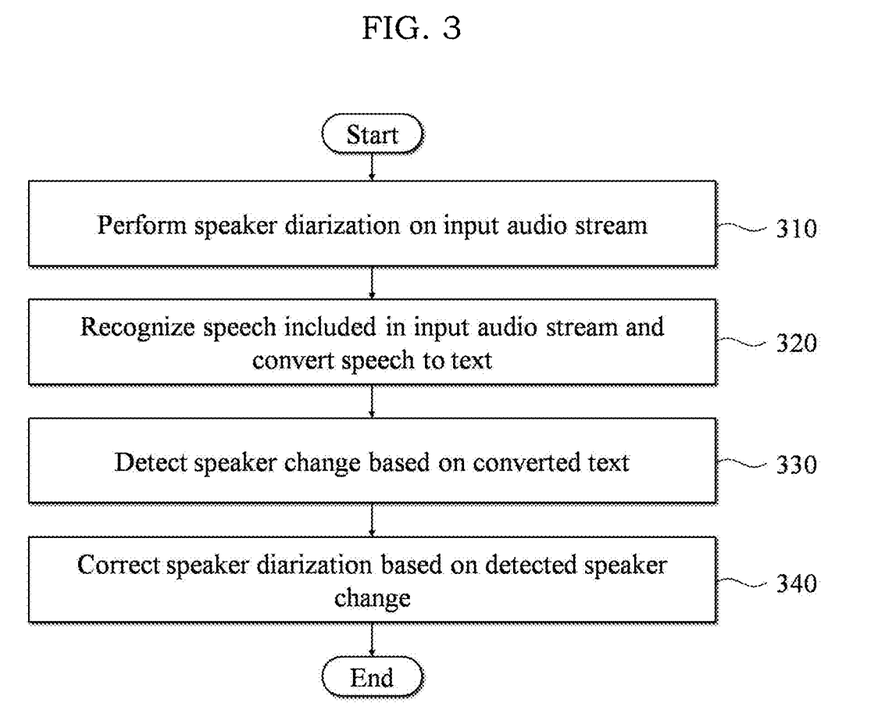
FIG. 3 is a flowchart illustrating an example of a method of correcting speaker diarization according to at least one example embodiment.

FIG. 3 is a flowchart illustrating an example of a speaker diarization correction method according to at least one example embodiment. The speaker diarization correction method of FIG. 3 may be performed by the computer apparatus 200. Here, the processor 220 of the computer apparatus 200 may be implemented to execute a control instruction according to a code of at least one computer program or a code of an OS included in the memory 210. Here, the processor 220 may control the computer apparatus 200 to perform operations 310 to 340 included in the method of FIG. 3 in response to the control instruction provided from the code stored in the computer apparatus 200.

In operation 310, the computer apparatus 200 may perform speaker diarization on an input audio stream. As described above, speaker diarization refers to a process of segmenting the input audio stream into homogeneous segments according to a speaker identifier, and also refers to technology that may improve the readability of automatic speech conversion by structuring an audio stream into a series of segments, by speaker, and by providing an actual identifier of a speaker when speaker diarization is being used with a speaker recognition system. For example, the computer apparatus 200 may model each speaker using a Gaussian mixture model and may allocate a frame corresponding to each speaker using a hidden Markov model.

In operation 320, the computer apparatus 200 may recognize speech included in the input audio stream, and may convert the speech to text. Here, a speech recognition result may be generated for each utterance section. For example, the speech recognition result for each utterance section may include a speech recognition result in an EndPoint Detection (EPD) unit. EPD refers to a scheme of finding an area with only speech in an audio stream. The computer apparatus 200 may generate the speech recognition result in an EPD unit. The speech recognition result may be in a text format.

In operation 330, the computer apparatus 200 may detect when there has been a speaker change based on the converted text. As an example embodiment, the computer apparatus 200 may recognize a speaker change status for each word unit of text using a module that is trained to receive the speech recognition result for each utterance section, and to output a speaker change probability of a word unit. Such a module may be implemented through "Bidirectional Encoder Representations from Transformers" (BERT), but this is provided as an example only. BERT refers to transformer-based machine learning technology for "natural language processing" (NLP) pre-learning, and may pre-learn an NLP task bidirectionally without education. The purpose of the BERT module is to learn a semantic vector that includes contextual information of a token constituting a text (i.e., contextual word embedding). Training of the BERT module may be performed by randomly erasing a token of an original text and by allowing a transformer model to predict the original text. If such a BERT learning process is pre-trained, performance improvements in various NLP tasks, such as object name recognition, part-of-speech recognition, intention recognition, and question and answering, may be expected.

Here, there is technology for training a BERT module to recognize a portion corresponding to a punctation mark (a period, a question mark, an exclamation mark, etc.) and other portions for all of the different portions based on large text data. In an example embodiment, the BERT module may be not trained to recognize a portion with a punctuation mark, but may instead be trained to recognize a portion with a speaker change, or the BERT module may be trained to recognize both a portion with a punctuation mark and a portion with a speaker change. As a more detailed example, the computer apparatus 200 may receive a speech recognition result for each utterance section, and may encode text included in the speech recognition result for each utterance section to a word unit of text. To this end, the computer apparatus 200 may encode an EPD unit text included in the speech recognition result for each utterance section to a word unit of text using a "sentence-BERT" (sBERT) module. Also, the computer apparatus 200 may encode the word unit of text to consider a conversation context after the word unit of text is encoded. For example, the computer apparatus 200 may additionally encode the word unit of text encoded using the sBERT module to consider the conversation context using a "dialog-BERT" (dBERT) module. The computer apparatus 200 may determine whether a speaker has changed (i.e., a speaker change is considered as being present) when compared to a previous word unit of text for each word unit of text in which the conversation context is considered. Here, BERT modules, including an sBERT module and a dBERT module, may output a speaker change probability for the word unit of text (e.g., output "1" for a speaker change and "0" for maintaining the same speaker), and the computer apparatus 200 may determine whether a speaker change is present for each word unit of text according to an output of the BERT modules.

In operation 340, the computer apparatus 200 may correct the speaker diarization based on the detected speaker change. For example, when it is determined that a speaker is diarized in a specific EPD unit through the speaker diarization that has been performed based on the speech in operation 310, but it is determined that the speaker has not changed for a word related to the corresponding EPD unit in operation 330, the computer apparatus 200 may correct the speaker diarization by indicating that the speaker is not diarized in the corresponding EPU unit. As described above, by using a speaker change status based on the text in which context is considered for correcting the speaker diarization, it is possible to solve recognition errors found in the existing speaker diarization technologies.

Figure 4:
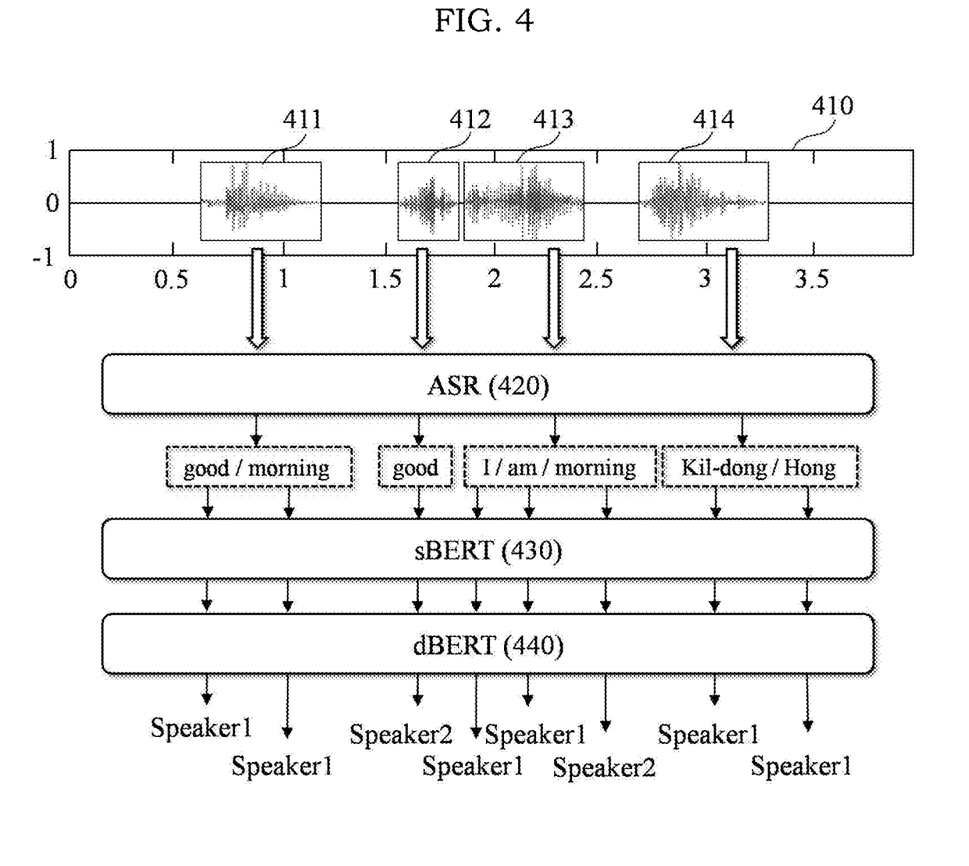
FIG. 4 illustrates an example of a speaker diarization correction process according to at least one example embodiment.

FIG. 4 illustrates an example of a speaker diarization correction process according to at least one example embodiment. In the example embodiment of FIG. 4, it is assumed that speaker 1 utters "Good morning. I am Kil-dong Hong" and speaker 2 utters "Good morning." The computer apparatus 200 may recognize a speech in an EPD unit from an audio stream 410. Here, the audio stream 410 of FIG. 4 includes recognized EPD units, for example, first to fourth EPD units 411, 412, 413, and 414. Here, it is assumed that the point in time at which speaker 1 utters "I am" and the point in time at which speaker 2 utters "morning" are similar to each other, and "I am" uttered by speaker 1 and "morning" uttered by speaker 2 are all included in the third EPD unit 413. In this case, in speaker diarization using only speech, "I am morning" of the third EPD unit 413 may be recognized as an utterance of a single speaker.

The computer apparatus 200 may recognize speech for each of the first to fourth EPD units 411, 412, 413 and 414 from the audio stream 410 through an automatic speech recognition (ASR) module 420. For example, a speech recognition result about the first EPD unit 411 may include "good morning" uttered by speaker 1, and a speech recognition result about the second EPD unit 412 may include "good" uttered by speaker 2. Also, a speech recognition result about the third EPD unit 413 may include "I am" uttered by speaker 1 and "morning" uttered by speaker 2, and a speech recognition result about the fourth EPD unit 414 may include "Kil-dong Hong" uttered by speaker 1.

Here, the computer apparatus 200 may encode the speech recognition result about each of the first to fourth EPD units 411, 412, 413, and 414 to a word unit of text through sBERT 430. That is, the speech recognition result about the first EPD unit 411 may be encoded to "good" and "morning," the speech recognition result about the second EPD unit 412 may be encoded to "good," the speech recognition result about the third EPD unit 413 may be encoded to "I," "am," and "morning," and the speech recognition result about the fourth EPD unit 414 may be encoded to "Kil-dong" and "Hong." In more detail, the computer apparatus 200 may encode an EPD unit text to a word unit of text using sBERT 430. Here, it is assumed that the sequence of recognized words is {good, morning, good, I, am, morning, Kil-dong, Hong}.

Subsequently, the computer apparatus 200 may encode the word unit of text such that the word unit of text considers the conversation context through dBERT 440. Here, considering the context may represent considering at least one previous word unit of text and/or at least one subsequent word unit of text. For example, while the appearance of "am" after "I" that is in the work unit of text may be determined to be contextually appropriate, the appearance of "morning" before "I" or after "good" or "I" may be determined to be contextually inappropriate.

Here, the computer apparatus 200 may determine whether a speaker change compared to a previous word unit of text is present for each word unit of text in which such conversation context is considered. For example, the computer apparatus 200 may recognize that a speaker has changed through the context for "morning" that is the previous word of the second "good" in the sequence of recognized words {good, morning, good, I, am, morning, Kil-dong, Hong}. Also, the computer apparatus 200 may recognize that the speaker has changed through the context for "good" when this word is the previous word of "I." As described above, the computer apparatus 200 may correct a speaker diarization for the audio stream 410 using a text-based speaker recognition. That is, although the speaker has changed through the speaker diarization for the audio stream 410, the speaker may be maintained with high confidence through the text-based speaker recognition. In this case, the speaker diarization for the audio stream 410 may be corrected so that the same speaker is maintained. Conversely, although the speaker is maintained through the speaker diarization for the audio stream 410, the speaker may be changed with high confidence through the text-based speaker recognition. In this case, the speaker diarization for the audio stream 410 may be corrected as that the speaker has changed.

To this end, when determining whether a speaker change compared to a previous word unit of text is present for each word unit of text in which the conversation context is considered, the computer apparatus 200 may calculate a confidence thereof, and may compare the calculated confidence to a threshold (e.g., a first threshold for the speaker change and/or a second threshold for maintaining a speaker), and may determine whether to apply text-based speaker recognition to a speaker diarization for the audio stream 410. Here, a method of calculating a confidence may use known methods, and may be pre-set based on a method of calculating the first threshold and/or the second threshold.

According to some example embodiments, it is possible to correct a point of a speaker change error by detecting a speaker change based on a recognized text after performing a speech-based speaker diarization.

The systems or apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media may continuously store computer-executable programs or may transitorily store the same for execution or download. Also, the media may be various types of recording devices or storage devices in a form in which one or a plurality of hardware components are combined. Without being limited to a media directly connected to a computer system, the media may be distributed over the network. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A speaker diarization correction method of a computer apparatus comprising at least one processor, the method, which uses the at least one processor, comprising:
    performing speaker diarization on an input audio stream;
    recognizing a speech included in the input audio stream and converting the speech to text;
    detecting a speaker change based on the converted text; and
    correcting the speaker diarization based on the detected speaker change,
    wherein the detecting of the speaker change comprises:
        receiving a speech recognition result for each utterance section, wherein each utterance section consists of at least one word unit, and further wherein each word unit comprises a single word of text;
encoding text included in the speech recognition result for each utterance section to one or more word units of text, wherein the encoding of the text to the one or more word units of text comprises encoding an EndPoint Detection (EPD) unit text included in the speech recognition result for each utterance section to the one or more word units of text using sentence Bidirectional Encoder Representations from Transformers (sBERT);
encoding each of the word units of text to consider a conversation context; and
determining whether a speaker change compared to a previous word unit of text is present for each word unit of text, individually, in which the conversation context is considered.

2. The method of claim 1, wherein the detecting of the speaker change comprises recognizing a speaker change status for each word unit of text using a module that is trained to receive a speech recognition result for each utterance section and to output a speaker change probability of a word unit.

3. The method of claim 1, wherein the encoding of the word unit of text to consider the conversation context comprises encoding the word unit of text to consider the conversation context using dialog Bidirectional Encoder Representations from Transformers (dBERT).

4. The method of claim 1, wherein the correcting comprises correcting the speaker diarization based on the word unit depending on whether the speaker change is present for each word unit of text.

5. A non-transitory computer-readable record medium storing instructions that, when executed by a processor, cause the processor to perform the following method:
    performing speaker diarization on an input audio stream;
    recognizing a speech included in the input audio stream and converting the speech to text;
    detecting a speaker change based on the converted text; and
    correcting the speaker diarization based on the detected speaker change,
    wherein the detecting of the speaker change comprises:
        receiving a speech recognition result for each utterance section, wherein each utterance section consists of at least one word unit, and further wherein each word unit comprises a single word of text;
        encoding text included in the speech recognition result for each utterance section to one or more word units of text, wherein the encoding of the text to the one or more word units of text comprises encoding an EndPoint Detection (EPD) unit text included in the speech recognition result for each utterance section to the one or more word units of text using sentence Bidirectional Encoder Representations from Transformers (sBERT);
        encoding each of the word units of text to consider a conversation context; and
        determining whether a speaker change compared to a previous word unit of text is present for each word unit of text, individually, in which the conversation context is considered.

6. A computer apparatus comprising:
at least one processor configured to execute computer-readable instructions,
wherein the at least one processor causes the computer apparatus to:
perform speaker diarization on an input audio stream,
recognize speech included in the input audio stream and convert the speech to text,
detect a speaker change based on the converted text, and
correct the speaker diarization based on the detected speaker change,
wherein the detecting of the speaker change comprises:
    receiving a speech recognition result for each utterance section wherein each utterance section consists of at least one word unit, and further wherein each word unit comprises a single word of text;
    encoding text included in the speech recognition result for each utterance section to one or more word units of text, wherein the encoding of the text to the one or more word units of text comprises encoding an EndPoint Detection (EPD) unit text included in the speech recognition result for each utterance section to the one or more word units of text using sentence Bidirectional Encoder Representations from Transformers (sBERT);
    encoding each of the word units of text to consider a conversation context; and
    determining whether a speaker change compared to a previous word unit of text is present for each word unit of text, individually, in which the conversation context is considered.

7. The computer apparatus of claim 6, wherein, to detect the speaker change, the at least one processor causes the computer apparatus to recognize a speaker change status for each word unit of text using a module that is trained to receive a speech recognition result for each utterance section and to output a speaker change probability of a word unit.

8. The computer apparatus of claim 6, wherein the encoding of the word unit of text to consider the conversation context comprises encoding the word unit of text to consider the conversation context using dialog Bidirectional Encoder Representations from Transformers (dBERT).

* * * * *